(12) United States Patent
Aspøy

(10) Patent No.: US 6,837,183 B2
(45) Date of Patent: Jan. 4, 2005

(54) DEVICE FOR HARVESTING OF AND TENDING TO SHELLS AND FOR CLEANING OF AN ASSOCIATED SHELL COLLECTOR IN WATER

(76) Inventor: Bjørn Aspøy, Bersagel, Sandnes (NO), N-4308

( * ) Notice: Subject to any disclaimer, the term of this patent is extended or adjusted under 35 U.S.C. 154(b) by 25 days.

(21) Appl. No.: 10/296,311

(22) PCT Filed: May 21, 2001

(86) PCT No.: PCT/NO01/00209

§ 371 (c)(1),
(2), (4) Date: Apr. 22, 2003

(87) PCT Pub. No.: WO01/93671

PCT Pub. Date: Dec. 13, 2001

(65) Prior Publication Data

US 2003/0177983 A1 Sep. 25, 2003

(30) Foreign Application Priority Data

May 22, 2000 (NO) .......................................... 20002621

(51) Int. Cl.[7] .............................................. A01K 61/00
(52) U.S. Cl. ..................................................... 119/237
(58) Field of Search ................................ 119/234, 236, 119/237, 238, 239

(56) References Cited

U.S. PATENT DOCUMENTS

| 385,161 | A | * | 6/1888 | Beach | 119/238 |
|---|---|---|---|---|---|
| 2,922,393 | A | * | 1/1960 | Munz | 119/238 |
| 3,017,856 | A | * | 1/1962 | Munz | 119/238 |
| 3,017,857 | A |   | 1/1962 | Munz | 119/4 |
| 3,556,052 | A | * | 1/1971 | Blount | 119/238 |
| 4,177,759 | A | * | 12/1979 | Maheo | 119/238 |
| 4,896,626 | A |   | 1/1990 | Holt et al. | 119/4 |
| 6,644,243 | B1 | * | 11/2003 | McRae | 119/234 |

FOREIGN PATENT DOCUMENTS

| AU | WO 8900004 | * | 6/1988 | ............ A01K/61/00 |
|---|---|---|---|---|
| FR | 2554319 A1 | * | 5/1985 | ............ A01K/61/00 |
| FR | 2607359 A1 | * | 6/1988 | ............ A01K/61/00 |
| FR | 2636206 A2 | * | 3/1990 | ............ A01K/61/00 |
| GB | 2144780 A | * | 3/1985 | ............ D07B/1/00 |
| JP | 9-9818 |   | 1/1997 | |
| NO | 303312 |   | 9/1997 | |
| NO | 991744 |   | 4/1999 | |
| WO | 98/58535 |   | 12/1998 | |

* cited by examiner

*Primary Examiner*—Peter M. Poon
*Assistant Examiner*—Bethany L Griles
(74) *Attorney, Agent, or Firm*—Andrus, Sceales, Starke & Sawall, LLP

(57) ABSTRACT

A device for example for the harvesting of farmed bivalves (6) in water (4), the bivalves (6) being attached to and growing on a bivalve net (10) in the water (4). According to the invention, the device, a bivalve harvester (2), has a propulsion device arranged thereto, and is formed of a frame with for example at least one rotatable harvesting roller (90, 92), which is pressed and rotated against the bivalve net (10) and the bivalves (6) during the harvesting of the bivalves (6), so that the bivalves (6) are thereby scraped or milled loose from the bivalve net (10), after which the bivalves (6) are collected and sucked into a catching device enclosing the harvesting roller(s) (90, 92). The bivalves (6) and bivalve bunches (8) are then pumped by means of a pumping device in a downstream direction into a pipe for further transport and collecting onto a vessel or a device placed in the vicinity of the bivalve harvester (2). Bivalve bunches (8) may possibly be separated into smaller units in a debunching pipe (192) placed for example immediately downstream of the catching device.) that functions as attachment body for a tool (1) or for the target objects (25) is placed.

17 Claims, 7 Drawing Sheets

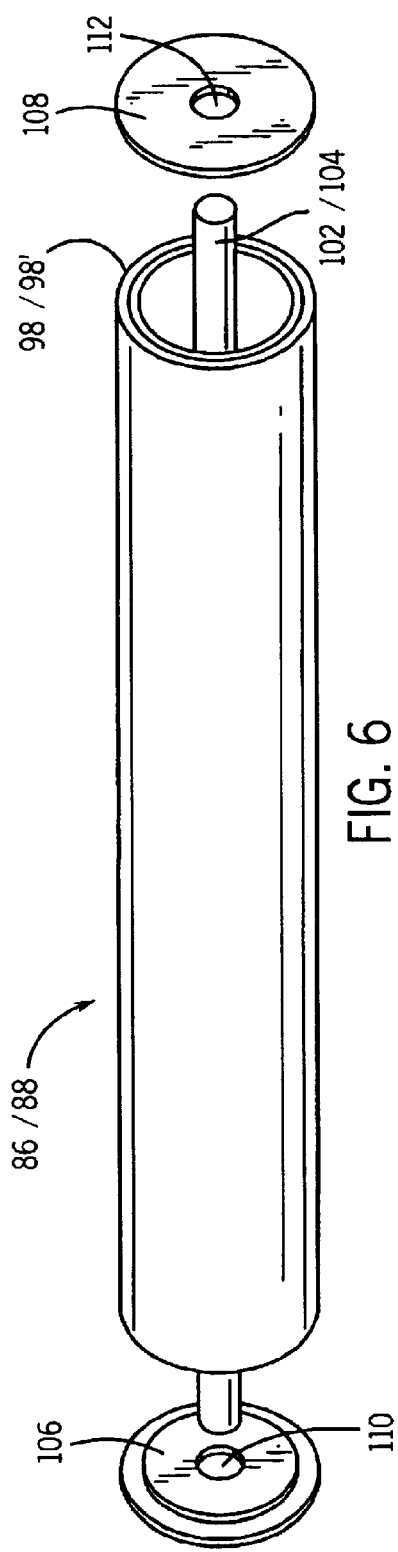
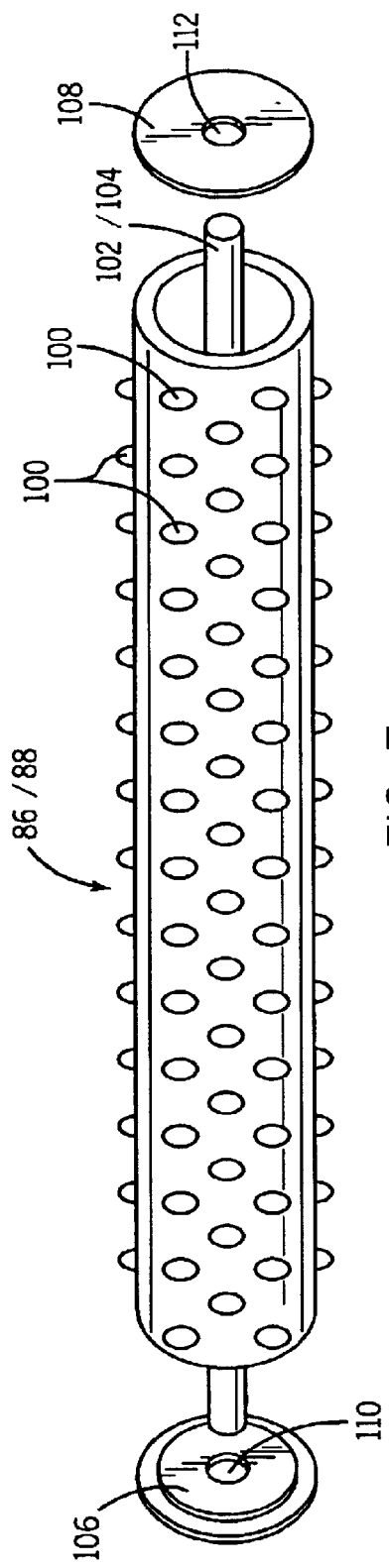

DEVICE FOR HARVESTING OF AND TENDING TO SHELLS AND FOR CLEANING OF AN ASSOCIATED SHELL COLLECTOR IN WATER

CROSS REFERENCE TO RELATED APPLICATION

The present application is the U.S. national stage application of International Application PCT/NO01/00209, filed May 21, 2001, which international application was published on Dec. 13, 2001 as International Publication WO 01/93671. The International Application claims priority of Norwegian Patent Application 20002621, filed May 22, 2000.

FIELD OF INVENTION

This invention relates to a device for use in connection with the farming of bivalves in farming facilities, wherein the device is used for harvesting and tending bivalves, e.g. mussels, in water, the bivalves being lodged on a bivalve collecting device, the device also being applicable for cleaning the bivalve collecting device in water. The farming facilities consist of one or more bivalve collecting devices, each bivalve collecting device being formed of a seine or a net resembling a fishing net, preferably, but not necessarily, of a coarse mesh. In the position of use, the bivalve collecting device, possibly bivalve collecting devices, in the following referred to as a bivalve net(s), is/are extended in the surface layer of the water preferably in a vertical, or approximately vertical, direction and preferably to the full length of the bivalve net, the upper portion, or the head line/support line, of the bivalve net being carried by one or more floating bodies in the surface, and the bottom portion, or foot line/bottom line, being weighted down and tightened by e.g. suitable sinkers or sinking means.

BACKGROUND OF THE INVENTION

The bivalve net is normally placed in seawater to catch pelagic spat of bivalves which are following the motion of the seawater, and which settle on a permanent growing place after some time, the permanent growing place consisting, in this case, of bivalve spat catching and farming facilities formed by one or more bivalve nets. Such bivalve collecting devices may be used for farming various kinds of bivalves, e.g. mussels.

In connection with known farming facilities for bivalves, it is common opinion and practice that the bivalves should be harvested and tended after their growing place, e.g. a rope or a strip of seine, with the farmed bivalves attached, has been brought ashore. Such an operation involves several drawbacks, many of the drawbacks being avoidable or reducible if harvesting and tending of the farmed bivalves, possibly cleaning of the bivalve collecting device could be carried out in water, and the present invention seeks to solve the technical challenges connected to harvesting and tending farmed bivalves and cleaning a bivalve net in water, preferably in seawater.

Known Technique

Devices for harvesting and tending bivalves in water, usually seawater, and cleaning associated bivalve net are known to a small degree.

In known forms of farming the bivalves are normally harvested and tended after the growing place with the attached farmed bivalves has been brought ashore.

Of such forms of farming the farming of bivalves may be mentioned, known i.a. from Japan, where for example small scallops are attached equally spaced along a great number of ropes hanging into the sea from floats, and nourish on prey in the form of micro-organisms and other nutrients floating past. The growing place, or the bivalve collecting device, may also simply consist of one or more ropes, either hanging vertically into the sea from above-lying floats, or hanging in a curve between two securing points near the water surface. Instead of rope(s), the bivalve collecting device may also be formed of one or more strips of seine (net resembling a fishing net). The attachment and growth area on the bivalve collecting device for the pelagic bivalve spat may be increased further through one or more ropes being passed through meshes of the net along each strip of seine. The use of fine-meshed seine as a bivalve collecting device has also been attempted.

Drawbacks of Known Technique

Harvesting and tending bivalves and cleaning the bivalve collecting device after they/it have/has been brought ashore is infested with a number of drawbacks. In good growing conditions bivalves normally grow fast and obtain a considerable weight and volume after some time. When the bivalves which are attached to one of more bivalve collecting devices in farming facilities, are to be lifted out of the water for harvesting or tending, the bivalve collecting device will be considerably heavier and more voluminous than when the bivalve collecting device was placed in the water. Therefore it may be relevant to dismantle the bivalve collecting device(s) into smaller units which are easier to handle, but still the work operation of bringing the complete bivalve collecting device, or units of it, with the attached bivalves ashore may require the use of heavy-duty lifting equipment and a relatively large loading area in order for the complete bivalve collecting device, or units thereof, to be laid down on a suitable vessel or device, e.g. a fish carrier. Besides, all lifting devices and load-carrying components of the bivalve collecting device must be formed and sized to withstand the final weight load applied to the bivalve collecting device when it is lifted out of the water, and the increasing weight load represented by the growing bivalves during the growing season in the water. After the bivalve collecting device with the attached bivalves has been brought out of the water, the bivalves are harvested and tended, possibly the bivalve collecting device is cleaned, often by hand, which is time-consuming work as the bivalves have often grown into bunches of bivalves, which will then have to be separated, and other organisms, e.g. starfish, and possible unwanted floating material, e.g. plastic bags and drift wood, must also be removed manually. Thus, there is a need for making some operations related to the farming of bivalves more efficient and automated to a greater extent.

Due to the small mesh width of the seine, the use of fine-meshed seine may have the effect that the farmed bivalves will grow tight together in a short time, so that water rich in oxygen and nutrients is prevented from flowing freely through the bivalve collecting device, and the farmed bivalves thereby will not have the required growing conditions.

OBJECT OF THE INVENTION

The device according to the invention should be utilizable for the harvesting and tending of bivalves and for the cleaning of an associated bivalve net in connection with bivalve farming, this farming industry thus being provided with a way of harvesting and tending the bivalves and cleaning the associated bivalve net in water, preferably seawater, thereby allowing some operations to be made more efficient and to be automated, so that the above-mentioned drawbacks can be avoided or reduced to a substantial degree.

Realization of the Object

The object is realized by the use of a device, in the following referred to as a bivalve harvester, in connection with bivalve farming, wherein the bivalve harvester is used for harvesting and tending the bivalves and cleaning the associated bivalve net in water, preferably seawater. In its position of use the bivalve net is preferably extended to the total horizontal length of the bivalve net in the surface layer of the water, the head line/carrying line of the bivalve net being provided i.a. with one or more floating bodies, preferably in the form of a floating tube/floating hose, floating in or near the surface of the water. The bivalve net is also extended in a preferably vertical, or approximately vertical, direction, the foot line/bottom line of the bivalve net being tightened and weighted down by e.g. suitable sinkers or sinking means.

A suitable vessel or device, e.g. a boat or a raft or raft-like device, possibly a land-based device, near the bivalve net/bivalve nets is used in order to place and operate the bivalve harvester in the water by means of preferably hydraulically activated mechanical devices and possibly and for example by an electrical manoeuvring and control device, the manoeuvring and control preferably being carried out from a mobile control panel.

In order to place the bivalve harvester in the water, the bivalve harvester is lifted from the vessel or the device, possibly from ashore, and placed over the bivalve net and its floating body (bodies), the floating body/floating bodies preferably being formed of one elongate floating tube or a floating hose, in the following referred to as a floating tube.

In principle the bivalve harvester is formed of a frame provided with at least one harvesting roller-rotatable about its longitudinal axis, possibly at least one tending or cleaning roller rotatable about its longitudinal axis. When the bivalves are being harvested or tended, the bivalve net possibly being cleaned, the relevant roller(s) is (are) placed against the bivalves and/or the bivalve net as the roll(s) is (are) being rotated.

Such a frame may be formed for example of frame components which are fixedly connected to each other, the frame being permanently arranged to the bivalve net in the water, the frame with the associated and relevant roller(s) for example being passed over the bivalve net and its floating body (bodies) when being placed in the water. On the other hand, such a frame solution is impractical and not much flexible, as for example maintenance of the bivalve harvester and replacing of said rollers are rendered difficult.

A more practical and flexible frame solution appears when the frame is formed of two frame parts which are pivotably connected, preferably at their uppermost portion in the position of use, for example by means of hinges or a hinge device, wherein each hinge or hinge device may be formed of two hinge parts which are interconnected and are pivotable about a preferably common pivot axle. When two or more hinges are used, the pivot axles of the hinges should have a common axis line. In the water the axis line of the hinges or hinge device runs parallel to, or approximately parallel to, said floating tube.

The bivalve harvester may be arranged to float in the water by the floating body (bodies), e.g. the floating tube, of the bivalve net, a floating solution which may be impractical, however, as both the floating tube and the bivalve net are thereby loaded with the weight of the bivalve harvester in water. An alternative to this floating solution may be for the bivalve harvester to have a floating device arranged thereto and surrounding it in the water, for example a raft or raft-like device. Another alternative may be that at least one of the frame parts of the bivalve harvester is formed as, or provided with, at least one floating body, each frame part being provided for example with one or more floating bodies, e.g. floats, placed at the upper portion of the frame part in use, the floating body or floating bodies providing the bivalve harvester with the necessary buoyancy in water. The floating body/floating bodies, possibly the surrounding floating device may moreover be arranged to be adjustable in the vertical direction and relative to the bivalve harvester, for example by means of a suitable number of spacer elements in the form of ropes, chains, flat irons, plates or similar, and so that the bivalve harvester can be placed around the bivalve net at the relevant depth in the water. When the bivalve harvester is placed in an open position in the water, preferably the lower portions of the frame parts are arranged to be pushed apart, for example by means of at least one hydraulically operated cylinder positioned between the frame parts. In its open position the bivalve harvester is placed around and preferably over the bivalve net, one frame part on either side of the bivalve net. Then preferably the lower portions of the two frame parts are pulled together into a locked position, for example by means of said hydraulically operated cylinder, and preferably so that they can be locked together by means of at least one releasable locking device. In their closed and locked position of use, the frame parts of the bivalve harvester are arranged to encompass the bivalve net in the full vertical, or approximately vertical, length of the bivalve net, including the head line and the foot line, and over a certain horizontal length of the bivalve net. Thereby a region or area of the bivalve net is completely enclosed by the frame parts of the bivalve harvester, and the harvesting or tending of the farmed bivalves, possibly cleaning of the bivalve net, may then be commenced, preferably from one of the ends of the bivalve net. The bivalve harvester then moves by means of a propulsion device, and at a suitable speed along the bivalve net in the water, harvesting or tending the bivalves that have lodged on the bivalve net, or possibly cleaning the bivalve net. Harvested bivalves, possibly collected waste organisms/waste, are then preferably pumped up and collected on the vessel, device or, more rarely, on shore. Collected waste organisms/waste may possibly, when conditions allow it, be pumped out directly and deposited directly in the water.

The two frame parts of the bivalve harvester, which are preferably of a square or rectangular shape, are cooperatingly and pivotably connected, each frame part being provided with a respective joining side, possibly joining portion, forming the upper portion of the frame part in the position of use, and an opposite side, possibly an opposite portion, preferably forming the lower potion of the frame part in the position of use, which sides or portions are spaced apart and connected by means of connecting sides, possibly connecting portions, the frame parts being pivotably connected along their joining sides or joining portions. As mentioned, the joining sides or joining portions of the frame parts, may be hinged together in the position of use, so that they can be pivoted relative to one another about a common horizontal, or approximately horizontal, axis line, so that the other sides or portions of the frame parts may thereby be opened and closed, for example by means of said hydraulic cylinder.

At least one of the frame parts is provided with at least one harvesting roller or tending roller, possibly at least one cleaning roller, which is rotatable about its longitudinal axis, the longitudinal axis extending vertically, or approximately vertically, between the joining side or the joining portion and the opposite side or portion in the position of use. Alternatively, at least one cooperating pair of rollers may be used, wherein the pair of rollers is placed, in the position of use, with one roller on either side of the bivalve net, and wherein, especially in the harvesting of bivalves, it will be of advantage to use two cooperating harvesting rollers, or a pair of harvesting rollers. In the tending of bivalves, for example when thinning the stock of bivalves, it may be relevant to use only one tending roller on one of the sides of the bivalve net.

As mentioned, such rollers are rotatable about their longitudinal axes and may be rotated by a motor, and possibly at least one roller of a pair of cooperating rollers is rotated by a motor, possibly both rollers of each pair of cooperating rollers are rotated by a motor each, such a motor preferably being of the infinitely variable and reversible kind. In its position of use the motor is arranged to the roller and preferably positioned immediately underneath it, the motor being powered for example electrically or hydraulically. In addition each roller is attached to its frame part preferably by means of a releasable support device, so that one type of roller can easily be replaced by another type of roller, for example a harvesting roller may be replaced by a tending roller or a cleaning roller.

The external shape of a roller depends on the task the roller is to perform in the harvesting and tending of the farmed bivalves. Therefore, a harvesting roller maybe formed or provided, for example, with profiled ribs, teeth, strings, threads or brushes. A tending roller or a cleaning roller, on the other hand, is preferably provided with threads, strings or brushes, and a tending roller is formed, for example, with wires, whereas a cleaning roller is formed with another and softer type of thread, the tending or cleaning roller possibly cooperating with a separate, but complementary, tending or cleaning brush positioned stationary to the frame part, this brush being formed for example with a type of thread corresponding to that of the complementary roller, so that unwanted organisms, e.g. starfish, and other waste may thereby be removed from the bivalve net.

When the bivalve harvester is closed and locked in its position of use, the bivalve harvester is moved in the direction of propulsion by a suitable propulsion device. Such a propulsion device may be arranged directly or indirectly to the bivalve harvester. A propulsion device arranged directly to the bivalve harvester may for example be formed by at least one propulsion roller, rotatable about its longitudinal axis, the longitudinal axis running vertically, or approximately vertically, between the joining side or the joining portion and the opposite side or portion of at least one frame part, in the position of use. The propulsion roller(s) is (are) pressed against the bivalve net, while, at the same time, the propulsion roller(s) is (are) being rotated, so that the bivalve harvester is thereby moved in the direction of propulsion along the bivalve net. A propulsion device indirectly arranged to the bivalve harvester may for example be formed by an arrangement of cables, wires or ropes and tackles, the cables, wires or ropes being arranged at one end to the bivalve harvester and being arranged at the other-end to e.g. a winch located for example on shore, the winch pulling the bivalve harvester in the desired direction along the bivalve net. The bivalve harvester may alternatively and for example have a surrounding floating device arranged thereto, e.g. a raft or raft-like device, this device otherwise being arranged with a propulsion device which is arranged to the floating tube of the bivalve net, for example by means of one or more suitable wheels or rollers, so that the device, and thereby the bivalve harvester, is moved in a desired direction of propulsion along the bivalve net.

When one or more propulsion rollers arranged to the bivalve harvester itself, are used, it will be of advantage to use at least two cooperating propulsion rollers, or a pair of propulsion rollers, said pair of rollers being positioned, in its position of use, with one roller on each side of the bivalve net, the rollers being pressed sufficiently hard against one another and against the intermediate bivalve net, while, at the same time, the rollers are being rotated, so that the bivalve harvester is moved in the desired direction of motion along the bivalve net. Like the harvesting, tending or cleaning rollers, the propulsion rollers may be rotated by a corresponding motor, at least one roller of a pair of cooperating rollers being rotated by a motor, possibly both rollers of each pair of cooperating rollers being rotated by a motor each. Correspondingly, in its position of use, the motor may be arranged to the roller immediately below it, the roller preferably being releasably supported in the associated frame part and thereby being exchangeable or replaceable. A propulsion roller may be provided with for example a cylindrical and evenly formed rubber membrane at its outer surface, or this surface may be provided with rubber knobs or possibly projecting teeth.

When one or more pairs of propulsion rollers is (are) used for the propulsion of the bivalve harvester, the propulsion rollers should be placed, seen relative to the moving direction, to the rear of the harvesting, tending or cleaning roller(s), the propulsion rollers thereby being pressed against the bivalve net and not against the attached bivalves. Propulsion of the bivalve harvester is provided in that the propulsion roller(s) on the right-hand side of the bivalve net, as seen from above and in the direction of motion, is (are) rotated anti-clockwise, whereas the propulsion roller(s) on the left-hand side of the bivalve net will have to be rotated clockwise. At the same time the harvesting, tending or cleaning roller(s) on the right-hand side of the bivalve net are rotated clockwise, whereas the harvesting, tending or cleaning roller(s) on the left-hand side of the bivalve net is (are) rotated anti-clockwise, the rollers on both sides of the bivalve net preferably being rotated at the same peripheral speed. Thereby the bivalve net between the propulsion rollers and harvesting, tending or cleaning roller(s) is held stretched, so that harvesting or tending of the bivalves, possibly cleaning of the bivalve net, proceeds more easily than if the bivalve net was not subjected to such stretching. As mentioned, both propulsion rollers of a pair of propulsion rollers may be rotated by a motor each, but each propulsion roller should be rotated at preferably equal peripheral speed. Alternatively and preferably only one of the propulsion rollers of the pair of rollers should be rotated by a motor, so that this propulsion roller is the moving propulsion roller, whereas, as a consequence of the pressing together of the two propulsion rollers, the other propulsion roller will follow passively in the rotational motion.

The clamping force of the rollers of a pair of rollers, and thereby the clamping force between each roller and the bivalve net, may possible be adjusted to the desired clamping force, for example by adjustment of the distance between the roller and the associated frame part, each roller preferably being positioned closer to the bivalve net than the respective frame part of each roller. This may be achieved, for example by positioning a hydraulic cylinder, or other spring device, or one or more mechanical spacer elements, possibly a similar device (devices), between the frame part and the points of support of the associated roller. Thereby the clamping force of the rollers of a pair of rollers, and thereby the clamping force between each roller and the bivalve net, may be adjusted as required, for example so that the bivalves are not crushed, and/or to achieve the desired frictional force between the bivalve net and the rollers, and preferably when the bivalve harvester is used in water. By the use of a hydraulic cylinder for this purpose, the clamping force of the cylinder may possibly be adjusted by means of known control technique, for example by means of at least one pressure sensor with other and necessary control arrangements/devices for such control-technical use arranged thereto.

Preferably, when pairs of harvesting, tending or cleaning rollers are used, the rollers of a pair of rollers should be somewhat staggered relative and parallel to one another and longitudinally of the bivalve net. When the bivalve harvester is closed and locked in its position of use, the harvesting and tending rollers are, in principle, pressed sufficiently hard and perpendicularly against the bivalves on the bivalve net, possibly the cleaning rollers against the bivalve net, the rollers of a pair of rollers being positioned on one side each of the bivalve net. Thereby the rollers do not exert a direct clamping force against each other, which spares the bivalves from being crushed during harvesting or tending, or which spares the bivalve net unnecessary wear when being cleaned.

The bivalves separated from the bivalve net are then caught in a catching device, e.g. a net, a sleeve or interconnected plates, completely or partially surrounding the harvesting roller(s) along the entire length(s) of the roller(s), or along parts thereof. The catching device may for example be divided into two equal, or approximately equal, catching sections which cooperate with and run parallel to the roller (s) in the position of use, the catching sections being arranged to a frame part each, so that the two sections are separated from each other when the bivalve harvester appears in its open position. As the bivalves are being-tended, possibly the bivalve net being cleaned, the waste organisms and/or the waste may be caught, in a manner similar to that of the harvesting of bivalves, in the catching device along the entire length(s) of the tending or cleaning roller(s), or along parts thereof. Alternatively the catching device may possibly be temporarily removed from the bivalve harvester, so that, when advisable, the waste organisms and/or the waste may be directed directly into the surrounding water.

In its position of use the catching device is preferably open through at least two ends or portions, one of these ends or portions, preferably located at the lower portion of the bivalve harvester, having an opening of a pipe arranged thereto through a transition device, e.g. a funnel. By means of a pumping device arranged directly or indirectly to this pipe, water containing the bivalves and the bunches of bivalves, possibly the waste organisms/waste, is pumped through the catching device and further downstream through the pipe. The pipe, e.g. a conveyor pipe, carries the flow of water containing the bivalves and the bunches of bivalves, possibly also waste organisms and other waste, further up to the vessel or device, possibly onto the shore. As mentioned, when bivalves are being tended, possibly the bivalve net being cleaned, waste organisms and other waste may, when advisable, possibly be directed directly into the water, for example into the seawater.

The above-mentioned pipe may for example have a so-called debunching pipe arranged thereto. This debunching pipe may be placed for example in the immediate vicinity and downstream of the catching device. Alternatively the debunching pipe may be located for example on the vessel or a suitable device, possibly on shore. As the name suggests, the debunching pipe is used in order to break apart, or debunch, bunches of bivalves, bivalves often growing together into bunches on the bivalve net. Such bunches of farmed bivalves must normally be broken apart for the purpose of facilitating the subsequent packing, transport and sales of the bivalves.

A debunching pipe is preferably of a straight and elongate configuration, and in its position of use, it is placed and secured underneath one of the two frame parts of the bivalve harvester for example, so that on propulsion of the bivalve harvester in the water, the debunching pipe runs unobstructed underneath the foot line of the bivalve net. The debunching pipe is arranged internally with a debunching device, which may be formed for example of a stator part, which cooperates with a preferably adjacent rotor part in order to break up the bunches of bivalves, the two cooperating parts being referred to in the following as a debunching unit, and longitudinally, the debunching pipe may possibly be provided with one or more such debunching units.

When one or more such debunching units are used, the stator and rotor parts are each provided with, for example, vanes, blades, strings or threads of a suitable configuration, size and of a suitable material, and are present in an adequate number. The stator part is formed of such vanes, blades, strings or threads which are anchored, and preferably releasably anchored, to the internal surface of the debunching pipe, whereas the rotor part is formed of such vanes, blades, etc., anchored, and preferably releasably anchored, to a rotary axle positioned along the centre line of the debunching pipe. For the rest, the debunching pipe may be formed of two preferably similar and releasable halves, so that these may easily be separated for the purpose of replacing, possibly repairing, the rotary axle and/or one or more debunching units, possibly individual vanes, blades, strings or threads.

The vanes, blades, strings and/or threads of the stator and rotor parts are preferably positioned radially about the centre line of the debunching pipe, and preferably so that the vanes, blades etc. are distributed by an identical angle distance along a common imaginary circumferential line. On the side opposite their anchoring points, the vanes, blades etc. may possibly be secured equidistantly along a circular ring, so that the free ends of the vanes, blades, strings or threads along this ring are connected to each other, such a connection being more rigid and stronger than if the individual vanes, blades, etc. were only anchored on one side.

As mentioned, in its position of use the stator part of the debunching unit cooperates with a rotor part, the rotor part being arranged sufficiently close to, preferably in the immediate vicinity of, the stator part, as the rotary axle with the rotor part mounted thereon is rotated. When a bunch of bivalves is carried by the water flow into the gaps between the vanes, blades, strings or threads of the rotor part and the stator part, the bivalve bunch may, as a consequence of the relative movement of the rotor part and the stator part, be broken into smaller bivalve bunches and individual bivalves. To prevent the bivalves from being crushed or damaged in the debunching process, all or some of the vanes, blades, strings or threads may possibly be provided with, or be formed entirely or partially from relatively soft materials, e.g. a suitable rubber material. Additionally, depending on for example the bivalve type and/or bivalve size, different types, possibly different configurations and/or combinations, of vanes, blades, strings or threads may be used in the rotor part and/or the cooperating stator part.

Several such debunching units may be used, wherein the debunching units are spaced apart, and the distance between each successive debunching unit, or each debunching step, may be the same or preferably decreasing, seen in the downstream direction of the water flowing through the debunching pipe. In principle the bivalve bunches should have been separated completely, or approximately completely, into individual bivalves when the bivalves leave the debunching pipe. The use of several such debunching units may therefore be required in order to separate the bunches of bivalves sufficiently well in two or more debunching steps, so that finally, and to the greatest degree possible, the bivalves will appear as individual bivalves. To accomplish this, different types, possibly different configurations and/or combinations, of vanes, blades, strings and/or threads may be used in each, possibly some, of the successive debunching steps and possibly within each individual debunching unit. In the tending of the bivalves, or in the cleaning of the bivalve net, possibly and for example the rotary axle and all, possibly some, of the vanes, blades, strings and/or threads may be removed or replaced by other suitable types of vanes, blades, strings and/or threads, which are possibly better suited for the tending and cleaning purposes. Alternatively the rotary axle may simply be left unactivated.

The rotary axle with the rotor part(s) attached thereto can be moved and rotated by a preferably hydraulically or electrically driven motor, for example of an infinitely variable and reversible kind, which is possibly controlled from a mobile control panel on the vessel or device, possibly from ashore. This motor is preferably arranged to the rotary axle and preferably at the downstream end thereof.

Separated bivalves and/or bivalve bunches, possibly collected waste organisms/waste, are transported further in the flow of water by means of a pumping device, and in a downstream direction by a conveyor of a suitable type and size, which extends up to the vessel or the device, or, more rarely, onto the shore.

The pumping device pumping the water containing the bivalves and/or the bivalve bunches, possibly waste organisms/waste, must be arranged to the pipe located downstream of the catching device. Such a pumping device may, in principle, be placed anywhere along or in connection with this pipe, for example immediately downstream of the debunching pipe, or on the vessel or device, or more rarely on shore. The pumping device is formed by for example a pump and an associated driving motor, e.g. a remote-controlled and infinitely variable hydraulically or electrically driven motor. Non-limiting examples of such pumping devices are injector pumps, vacuum pumps, airlift pumps and centrifugal pumps.

On the vessel or device the bivalves may then be collected in suitable containers, e.g. cases, storage tanks or wells, e.g. on a fish carrier or in a collecting enclosure, after which possible further processing and/or further transport is carried out before the bivalves are distributed and possibly consumed. Unwanted organisms, e.g. starfish, and any other waste may correspondingly be collected in suitable storage containers or, when advisable, be deposited in the water/sea, as mentioned.

Advantages Achieved Through the Invention

The most obvious advantage of the invention is that farmed bivalves attached to a bivalve collecting device in the form of a bivalve net may be harvested and tended in their natural growing place in water, preferably in seawater, and the possibility of cleaning the bivalve net in water. Thereby, having to dismantle and remount the whole, or units of, the bivalve collecting device before it/they is/are lifted ashore or aboard a suitable vessel or device for the harvesting and tending of the bivalves, possibly cleaning of the bivalve net, is avoided, such harvesting and tending, possibly such cleaning, normally being time-consuming and often being carried out manually. Possibly having to use heavy-duty lifting equipment for heavy lifts of the whole or parts of the bivalve collecting device and the farmed fish attached thereto, is thereby avoided, which heavy lifts could also cause damage to the bivalve net and the bivalves. By the very fact that harvesting and tending, possibly cleaning, are carried out in water, all lifting devices and load-carrying components of the bivalve collecting device may be formed and sized to resist a smaller weight load than when the bivalve collecting device and the attached bivalves have to be lifted out of the water. The use of the bivalve harvester also results in less time-consuming, more efficient and, to a greater degree automated harvesting and tending of the bivalves, possibly cleaning of the bivalve net. This makes it possible, for example, for the bivalves to be delivered from the vessel, device, fish carrier or collecting enclosures in a fully, or approximately fully, prepared state for further processing, transport and sale, or for possible waste or waste organisms to be delivered from the vessel or device in a totally collected state, possibly for such waste to be deposited in the water, when advisable.

BRIEF DESCRIPTION OF THE FIGURES OF THE DRAWINGS

In the following part of the description, and referring to the FIGS. 1–9, there will be shown one non-limiting exemplary embodiment of the bivalve harvester, as it is being used, and exemplary embodiments of rollers included in the bivalve harvester, one particular reference numeral referring to the same detail in all drawings, in which this detail is identified, wherein

FIG. 2 shows a view and vertical partial section II—II, cf. FIG. 3, FIG. 4 and FIG. 5, of a bivalve harvester according to the invention, the bivalve harvester being placed in its position of use over a coarse-meshed bivalve net in the water, wherein farmed bivalves attached to the bivalve net are harvested by means of the bivalve harvester which is moving horizontally in the water and along the bivalve net. The drawing also indicates a horizontal line of section III—III and vertical lines of section IV—IV and V—V;

FIG. 3 shows a horizontal section III—III, cf. FIG. 2, FIG. 4 and FIG. 5, of the bivalve harvester during harvesting of farmed bivalves in the water, wherein the bivalve harvester is moved forward along the bivalve net by means of a pair of propulsion rollers positioned around the bivalve net at the rear portion (relative to the direction of propulsion) of the bivalve harvester, and wherein the harvesting of the bivalves is carried out by a pair of harvesting rollers placed around the bivalve net at the front portion of the bivalve harvester. The drawing also indicates vertical lines of section II—II, IV—IV and V—V;

FIG. 4 shows, like FIG. 1, a view of the bivalve harvester seen along the vertical line of section IV—IV, cf. FIG. 2 and FIG. 3, but the bivalve harvester is shown in a closed position round the bivalve net, one propulsion roller bearing on either side of the bivalve net and pressing against it, the pair of propulsion rollers moving the bivalve harvester in the direction of propulsion. The drawing also indicates the horizontal line of section III—III and vertical line of section II—II;

FIG. 5 shows a view of the bivalve harvester seen along the vertical line of section V—V, cf. FIG. 2 and FIG. 3, the bivalve harvester being shown in a closed position around the bivalve net, one harvesting roller bearing on each side of the bivalve net, the bivalves being harvested by means of the pair of harvesting rollers. The drawing also indicates the horizontal line of section III—III and vertical line of section II—II;

FIG. 6 shows one example of a propulsion roller, formed with a rubber membrane at its outer surface;

FIG. 7 shows one example of a propulsion roller, provided with rubber knobs at its outer surface;

Figure 1:
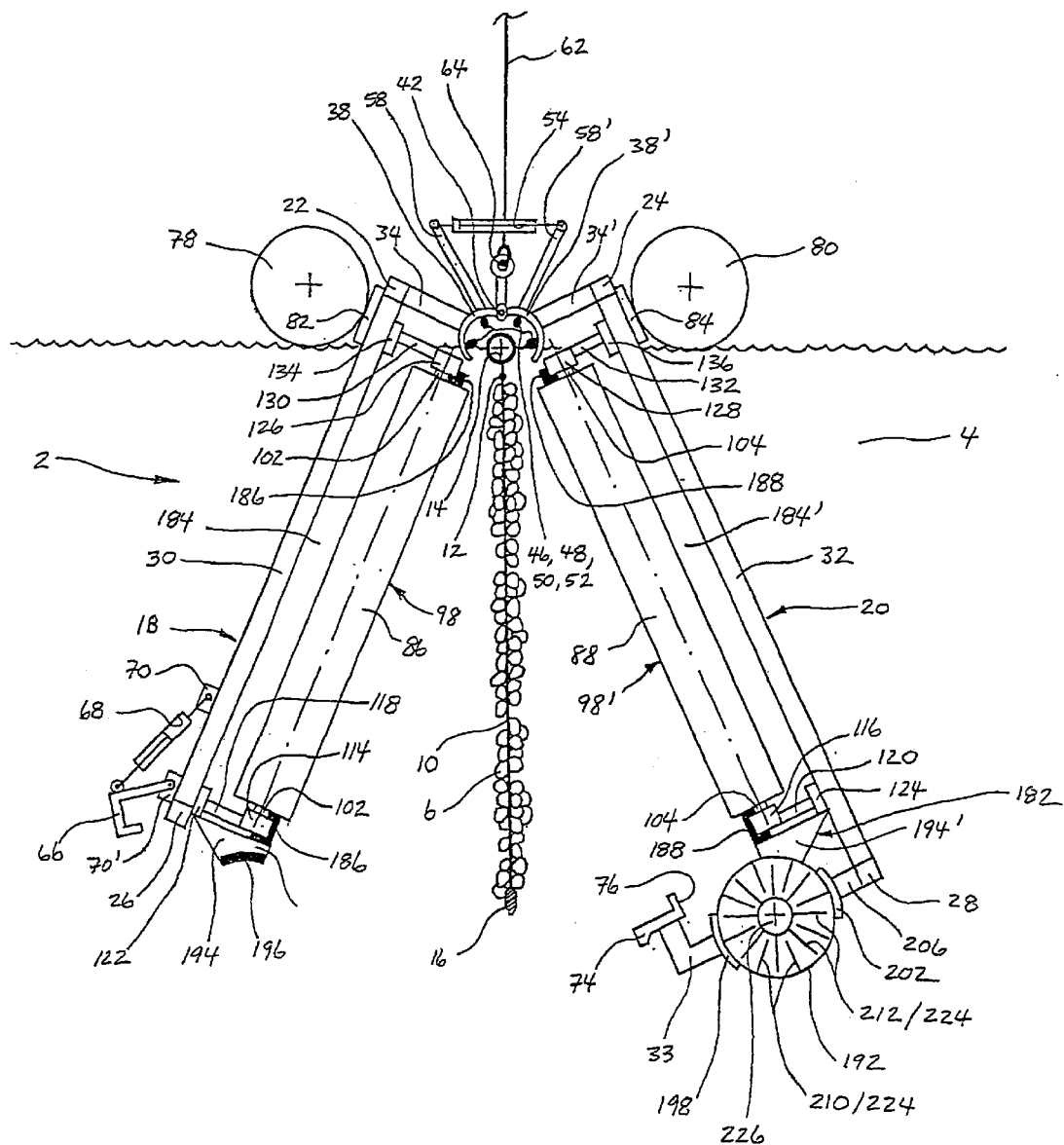
FIG. 1 shows a view of the bivalve harvester seen along the vertical line of section IV—IV, cf.
Figure 2:
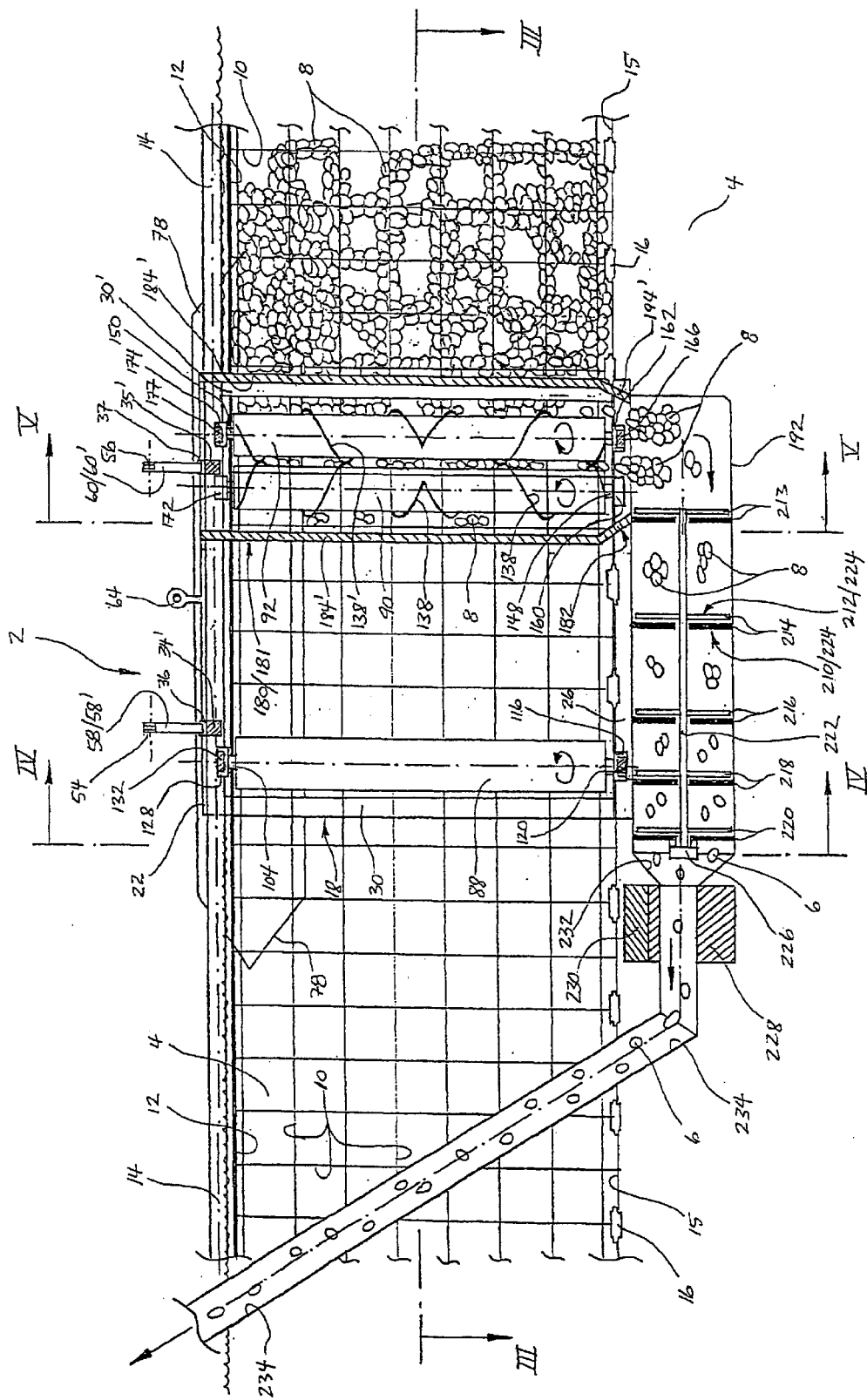
FIGS. 2 and 3, the bivalve harvester being shown in an open position, while hanging on a wire and being about to be placed about the bivalve net in the water.
Figure 3:
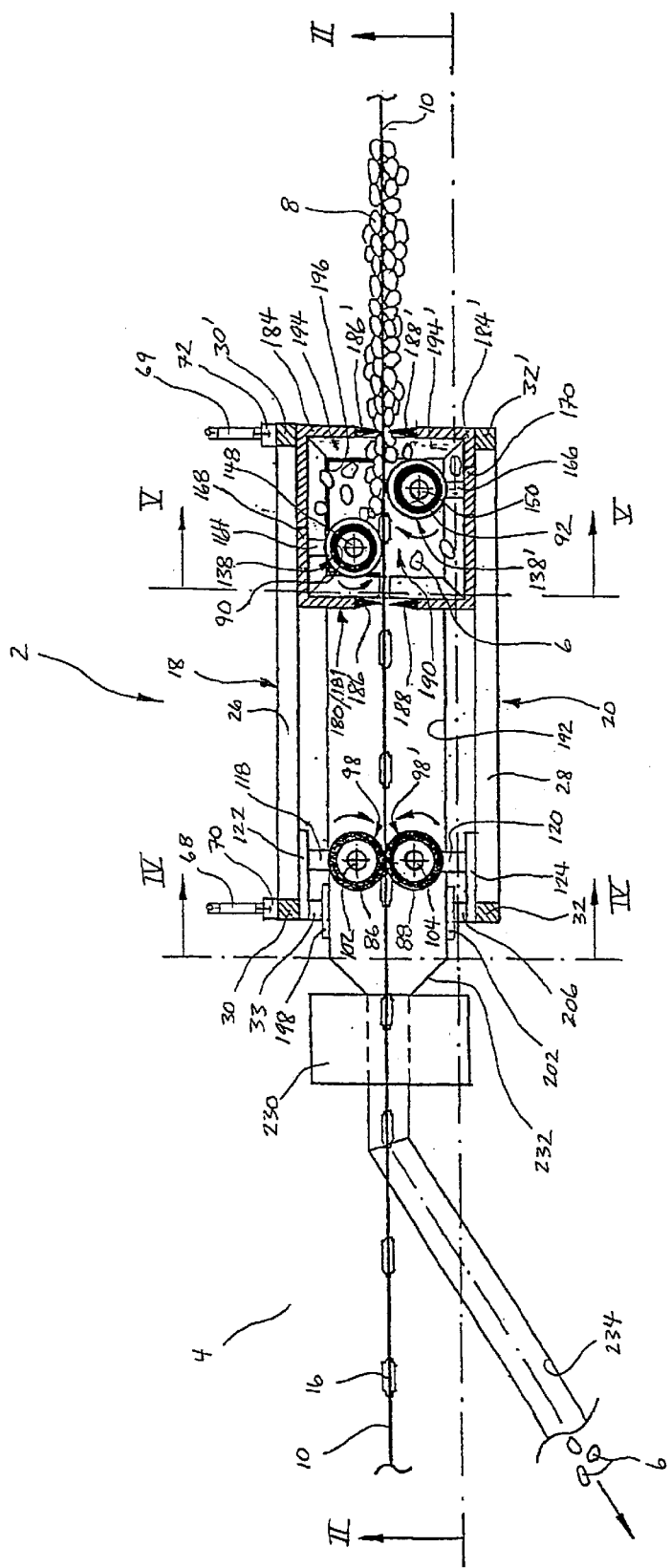

It should be noted that all drawings are distorted as regards sizes and distances.

DESCRIPTION OF EXEMPLARY EMBODIMENTS OF THE INVENTION

Equipment and/or arrangements which do not concern the invention itself, but otherwise are or may be necessary conditions for practicing the invention, will not be specified further or more thoroughly described in the following exemplary embodiment.

Such equipment and/or arrangement comprises a vessel or device, e.g. a boat or a raft or raft-like device, not shown in the drawn figures, from/to which a bivalve harvester 2 is lifted from and into the water 4, preferably seawater, and from which it is operated, and from/to which harvested bivalves 6 or bivalve bunches 8, possibly waste, e.g. starfish, plastic bags or drift wood, are conveyed. The vessel or device is also provided with other necessary devices, e.g. a hoisting device, hydraulic and/or electric auxiliary and controlling systems and equipment, and possibly other equipment necessary for carrying out harvesting and tending of the farmed bivalves 6, in the following referred to as the bivalves 6, on a bivalve net 10, and possibly for cleaning the bivalve net 10. The presence of a bivalve net 10, in this case a coarse-meshed bivalve net 10, in the water 4 is also an absolute condition for the practicing of the invention, the bivalve net 10 being extended to its full length in the water 4 and hanging vertically, or approximately vertically, into the water 4, and the bivalve net 10 being provided, at its upper portion, with a headline 12 (a support line) connected to a continuous floating tube 14 extending in the full length of the bivalve net 10 and providing the bivalve net 10 with the necessary buoyancy. A lower portion, or foot line 15 (a bottom line) of the bivalve net 10 is weighted down and stretched by suitable sinkers 16.

The bivalve harvester 2 is formed by two hingedly connected and cooperating frame parts 18 and 20, the frame parts 18 and 20 being of a square or rectangular configuration, and each frame part 18 or 20 being formed by one top side 22 or 24 and one opposite bottom side 26 or 28, which are horizontal, or approximately horizontal, in the position of use, and each frame part 18 or 20 additionally being formed by two vertical, or approximately vertical, connecting sides 30 and 30', respectively 32 and 32', arranged in pairs and spaced apart. The connecting sides 30 and 30' of the frame part 18 are shorter than the connecting sides 32 and 32' of the frame part 20. Moreover, the frame part 18 has a debunching pipe 192, which will be described later, arranged thereto by two angular stays 33 and 33', the angular stays 33 and 33' being positioned underneath the frame part 18 in the position of use and arranged thereto by means of a releasable locking device each, which will be described later.

Along their top sides 22 and 24, the frame parts 18 and 20 each have two connecting stays 34 and 35, 34' and 35', respectively, arranged thereto and spaced apart, the connecting stays 34 and 35 and the connecting stays 34' and 35' projecting for example horizontally and at right angles from their top sides 22 and 24. The connecting stays 34 and 34' and the connecting stays 35 and 35', in pairs, have a respective hinge 36 and 37 arranged thereto, the hinges 36 and 37 being spaced apart. The hinges 36 and 37 are each formed of two hinge parts 38 and 38', 40 and 40', respectively, connected in pairs. The hinge parts 38 and 38 each have a connecting stay 34 and 34' arranged thereto, whereas the hinge parts 40 and 40' each have a connecting stay 35 and 35' arranged thereto. The hinge parts 38 and 38' are pivoted relative to one another about a common pivot axle 42 positioned in the hinge 36, whereas the hinge parts 40 and 40' are pivoted relative to one another about a common pivot axle 44 positioned in the hinge 37. The pivot axles 42 and 44 have a common axis line, extending, in the position of use, parallel to, or approximately parallel to, said floating tube 14 in the water 4. Thereby the frame parts 18 and 20 are pivotable relative to one another, so that the bivalve harvester 2 can be opened and closed around the bivalve net 10.

Each hinge part 38, 38', 40 and 40' is formed as one half of a cylinder, of a semicircular cross-section. Hinged together two cooperating hinge parts 38 and 38' and 40 and 40' may therefore be closed around the floating tube 14 of the bivalve net 10, so that in their closed position they adopt a cylindrical shape. On their internal surfaces and longitudinally to the floating tube 14, the hinge parts 38 and 38' of the hinge 36 are provided with four longitudinal gliding strips 46, 48, 50 and 52. Correspondingly, on its internal surfaces and longitudinally to the floating tube 14, the hinge 37 is provided with four longitudinal gliding strips 46', 48', 50' and 52'. At their end portions the gliding strips 46, 48, 50 and 52, and the gliding strips 46', 48', 50' and 52' take a wedged shape, whereby their end portions avoid getting stuck in the bivalve net 10 as the bivalve harvester 2 is driven forward. Alternatively said gliding strips 46, 48, 50 and 52, and the gliding strips 46', 48', 50' and 52 may be replaced for example by a suitable number of rollers, not shown, suitably positioned on the internal surfaces of the hinge parts 38, 38', 40 and 40'.

Figure 4:
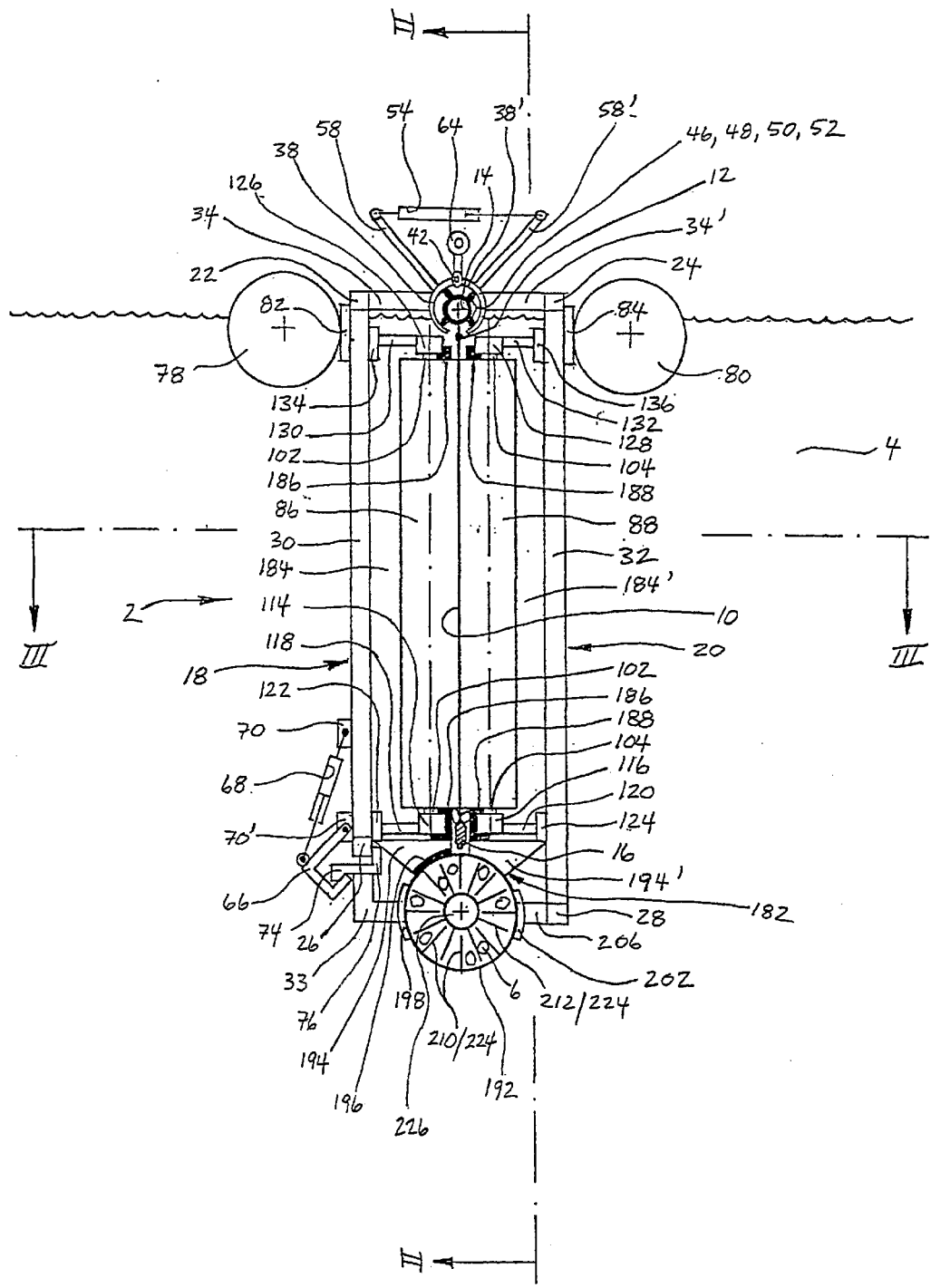
Figure 5:
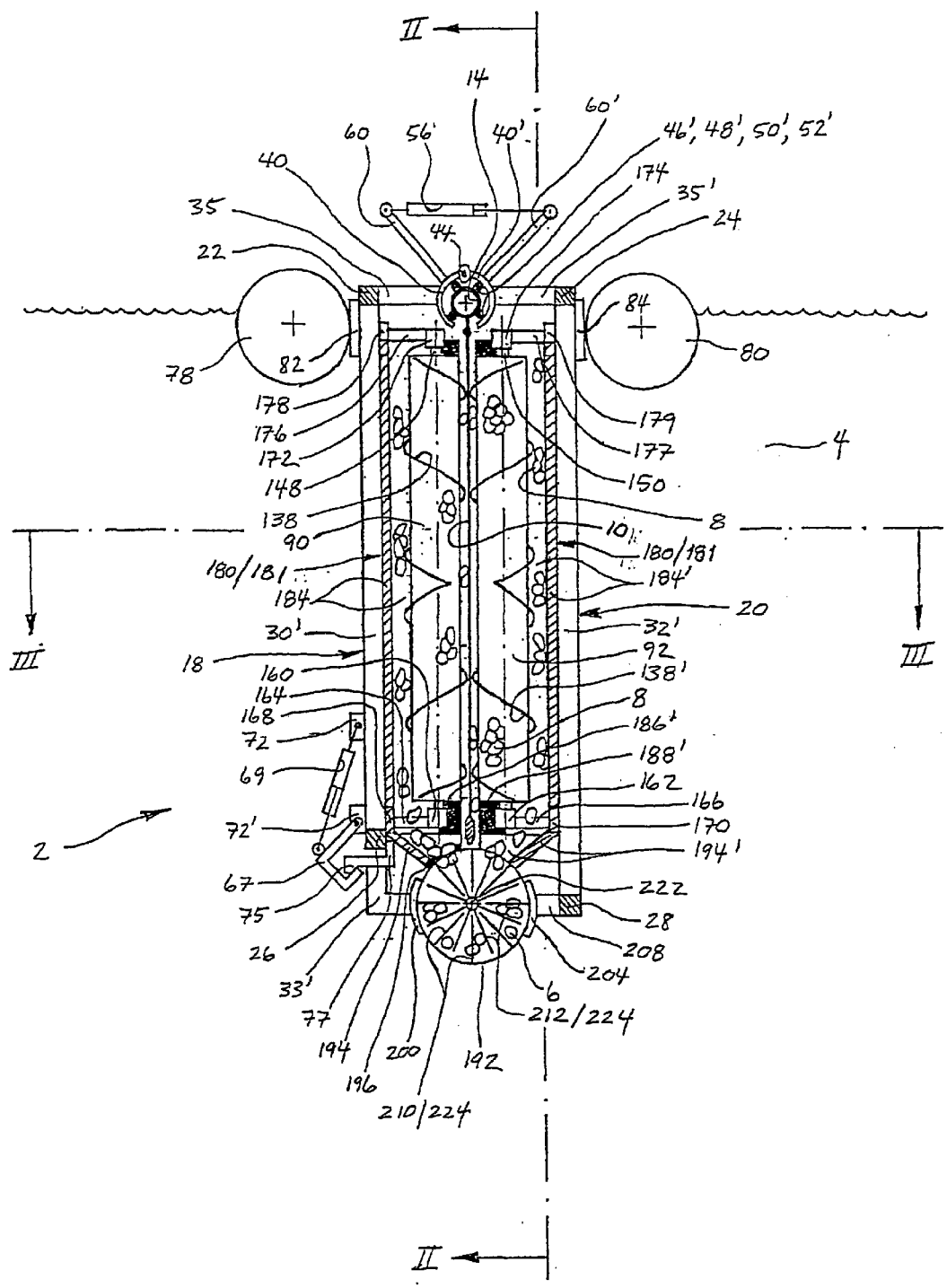

Opening and closing of the frame parts 18 and 20 may be effected by two for example remote-controlled and double-acting hydraulic cylinders 54 and 56 connected to a hinge 36 and 37 each. In this exemplary embodiment the cylinders 54 and 56 are each placed between two stays 58 and 58' and 60 and 60', which extend upwards in the position of use, each end portion of the cylinder 54 and the cylinder 56, respectively, being rotatably connected to the upper end of a respective stay 58 and 58', or a respective stay 60 and 60'. Each stay 58 and 58', or each stay 60 and 60', are fixedly arranged to a respective hinge part 38 and 38' of the hinge 36, and a respective hinge part 40 and 40' of the hinge 37. In their contracted position the hydraulic cylinders 54 and 56 will thus cause the frame parts 18 and 20 to open relative to one another, cf. FIG. 1, whereas in their extended position the hydraulic cylinders 54 and 56 cause the frame parts 18 and 20 to close relative to one another, cf. FIG. 4 and FIG. 5.

By means of the above-mentioned devices the bivalve harvester 2 is then placed in an open position over the bivalve net 10 in the water 4 while the bivalve harvester 2 is hanging on a wire 62. Referring to FIG. 1, the wire 62 is attached at one end to a lifting lug 64 on the bivalve harvester 2, whereas at its opposite end the wire 62 is connected to a hoisting device on the adjacent vessel or device, not shown. The bivalve harvester 2 is then lowered sufficiently far into the water 4 for the frame parts 18 and 20 of the bivalve harvester 2 to close completely around the bivalve net 10, its headline 12 and foot line 15, and its sinkers 16 and floating tube 14.

The frame parts 18 and 20 are then locked together in the closed position by means of two identical and releasable locking devices, one locking device being located between the angular stay 33 and the bottom side 26 of the frame part 18, the other locking device being located between the angular stay 33' and the bottom side 26 of the frame part 18. The locking devices are each formed of a pivotable locking hook 66 or 67, each having a for example remotely controlled and double-acting hydraulic cylinder 68 or 69 arranged thereto. The hydraulic cylinders 68 and 69 are rotatably arranged to the frame part 18 by means of a respective mounting plate 70 and 72, and the locking hooks 66 and 67 are pivotably arranged to the frame part 18 by means of a respective mounting plate 70' and 72'. The frame parts 18 and 20 of the bivalve harvester 2 are locked together in their closed position by the hydraulic cylinder 68 and 69 pushing, and thereby pivoting, the locking hooks 66 and 67 into engagement with a respective complementarily formed hook retainer 74 and 75, the hook retainer 74 being attached to the angular stay 33, and the hook retainer 75 being attached to the angular stay 33', cf. FIGS. 4 and 5. The hook retainers 74 and 75 are formed at the same time with a plate 76 and 77 each, which are vertical in the position of use, extending upwards within the angular stays 33 and 33', the plates 76 and 77 serving as abutment surfaces, against which the frame part 18 abuts, when the frame part 18 is to be closed together with the frame part 20. Otherwise the locking hook 66 is shown in its open and detached position in FIG. 1.

Placed over the bivalve net 10, the bivalve harvester 2 is kept floating in the water 4 by means of two floats 78 and 80 arranged at the upper portion of each frame part 18 and 20, each of the floats 78 and 80 being secured to the frame parts 18 and 20 by means of a mounting plate 81 or 84 each, and straps, fastening bands or similar fasteners, not shown in the drawings. If the bivalve net 10 is kept floating at a certain depth below the water surface, the straps, fastening bands or similar fasteners may possibly be adjusted in the vertical longitudinal direction, so that the bivalve harvester 2 is floating at a desired depth relative to the bivalve net 10. Otherwise the adjusting device is not shown in the drawings. Additionally, the floats 78 and 80 may possibly be ballasted.

In its closed and locked position the bivalve harvester 2 moves at a suitable speed in the direction of motion and along the bivalve net 10, preferably from one of the ends of the bivalve net 10, harvesting or tending, e.g. thinning, the bivalves 6 on the bivalve net 10, or possibly cleaning the bivalve net 10.

Seen relative to the moving direction of the bivalve harvester 2, propulsion of the bivalve harvester 2 and harvesting, possibly tending, of the bivalves 6, possible cleaning of the bivalve net 10, are effected by means of one front pair and one rear pair of rollers, each pair of rollers appearing in its position of use with one roller on each side of the bivalve net 10, the rollers of each pair, and the pairs between themselves, cooperating as the rollers are positioned parallel to each other. The front and rear pairs of rollers are placed at equal height (or depth) about the bivalve net 10. Propulsion of the bivalve harvester 2 is effected by the rear pair of rollers, formed by two cooperating propulsion rollers 86 and 88, whereas harvesting of the bivalves 6, possibly tending of the bivalves 6 or cleaning of the bivalve net 10, is effected by the front pair of rollers, which is formed by two cooperating harvesting rollers 90 and 92, possibly two tending or cleaning rollers 94 and 96. It is pointed out that tending, e.g. thinning, of the bivalves 6, possibly cleaning of the bivalve net 10, may be carried out by just one tending or cleaning roller 94 or 96, wherein only one side of the bivalve net (10) is thereby being tended, possibly cleaned.

Propulsion of the bivalve harvester 2 is provided by two cooperated propulsion rollers 86 and 88 attached to a respective frame part 18 and 20. Each propulsion roller 86 and 88 is elongate and rotatable about its longitudinal axis, the propulsion rollers 86 and 88 running vertically, or approximately vertically, from their top sides 22 and 24 to their opposite bottom sides 26 and 28 of the frame parts 18 and 20, in their position of use. When the bivalve harvester 2 is closed and locked in its position of use, the propulsion rollers 86 and 88 are pressed sufficiently hard and, relative to the intermediate bivalve net 10, at right angles against one another. At its outer surface each of the propulsion rollers 86 and 88 in the exemplary embodiment is formed with a cylindrical and evenly formed rubber membrane 98 and 98', cf. FIG. 6. Alternatively each propulsion roller 86 and 88 may be provided with for example rubber knobs 100 on its outer surface, cf. FIG. 7, or for example projecting teeth. As the two propulsion rollers 86 and 88 are forced against each other and against the bivalve net 10 while rotating, sufficient friction is created between them for the bivalve harvester 2 to be moved in the desired direction along the bivalve net 10. Seen from above and in the moving direction, the propulsion roller 88 on the right-hand side of the bivalve net 100 must therefore be rotated anti-clockwise, whereas the propulsion roller 86 on the left-hand side of the bivalve net 10 must be rotated clockwise. Longitudinally, each propulsion roller 86 and 88 is provided with a respective rotatable through centre axle 102 and 104, each of the centre axles 102 and 104 being attached at their end portions to a respective propulsion roller 86 or 88 by means of two circular mounting plates 106 and 108, each provided with a centred hole 110 and 112, through which the centre axle 102 or 104 is passed, cf. FIGS. 6 and 7. To provide the required rotary motion, each centre axle 102 and 104 has, at its lower end portion in the position of use, a respective hydraulic motor 114 and 116 arranged thereto, which is for example, remotely controlled, infinitely variable and reversible. In an alternative not shown, only one of the propulsion rollers 86 and 88 is driven by a hydraulic motor 114 or 116. In use each propulsion roller 86 and 88 is driven at preferably equal peripheral speed. The motors 114 and 116 are each attached to a respective spacer element 118 and 120, each arranged to a respective mounting plate 122 and 124, each mounting plate 122 and 124 being arranged to a respective frame part 18 and 20. In addition each propulsion roller 86 and 88 is releasably supported at its upper end portion on a respective bearing pedestal 126 and 128, which is secured to a respective spacer element 130 and 132, the spacer elements 130 and 132 being arranged to a respective frame part 18 and 21 by means of a mounting plate 134 and 136 each. The propulsion rollers 86 and 88 may for example be releasably supported on the frame parts 18 and 20 by means of a lockable hinge-lid, not shown, arranged to each of the bearing pedestals 126 and 128. Thereby one or both of the propulsion rollers 86 and 88 and/or one or both of the harvesting rollers 90 and 92, possibly one or both of the tending or cleaning rollers 94 and 96, may be exchanged or replaced when necessary. The compressive force between the propulsion rollers 86 and 88 may possibly be adjusted by adjusting the distance between the relevant propulsion roller 86 or 88 and the associated frame part 18 or 20, which can be achieved through adjustment of the spacer elements 118 and 120 and the spacer elements 130 132. This may be achieved, for example, by placing a hydraulic cylinder not shown, or a spring device not shown, or one or more mechanical spacer elements not shown, or a similar device/devices not shown, between the support points of the frame part 18 and the propulsion roller 86 and the frame part 20 and the propulsion roller 88, possibly between those of the frame part 18 and the harvesting roller 90 and the frame part 20 and the harvesting roller 92, possibly between those of the frame part 18 and the tending or cleaning roller 94 and the frame part 20 and the tending or cleaning roller 96, moreover not shown in the drawings. Thereby, as required, for example the clamping force between the propulsion rollers 86 and 88, and thereby the frictional force between the bivalve net 10 and the propulsion rollers 86 and 88, may be adjusted, or the clamping force between the bivalves 6 on the bivalve net 10 and a harvesting roller 90 and/or 92 may possibly be adjusted, or for example the clamping force between the bivalve net 10 and a tending or cleaning roller 94 and/or 96 may be adjusted.

Harvesting and tending of the bivalves 6, possibly cleaning of the bivalve net 10, is effected by means of the front pair of rollers, the front pair of rollers being formed by two cooperating harvesting rollers 90 and 92, possibly by two cooperating tending or cleaning rollers 94 and 96. In the following description the assembly and function of a pair of harvesting rollers will be explained, the assembly and function of a pair of tending or cleaning rollers being approximately identical to the assembly and function of a pair of harvesting rollers.

When the bivalve harvester 2 is closed and locked in its position of use, the harvesting rollers 90 and 92 are forced adequately hard against the bivalves 6 on the bivalve net 10 not to break them. Unlike the positioning of the propulsion rollers 86 and 88 in the bivalve harvester 2, the harvesting rollers 90 and 92, seen in the moving direction of the bivalve harvester 2, are staggered parallel to one another and spaced apart, so that the harvesting rollers 90 and 92 do not exert a clamping force on each other, but on the other hand a clamping force against the bivalves 6 and the bivalve net 10. Harvesting of the bivalves 6 takes place in that, in its position of use, the bivalve harvester 2 is moved in the moving direction of the propulsion rollers 86 and 88, while the harvesting rollers 90 and 92 are being rotated at the desired and preferably equal peripheral speed and with the desired compressive force against the bivalves 6 on the respective sides of the bivalve net 10. Seen from above and in the direction of motion, the harvesting roller 92 on the right-hand side of the bivalve net 10 must be rotated clockwise, whereas the harvesting roller 90 on the left-hand side of the bivalve net 10 must be rotated anti-clockwise. The indicated rotary motion of the harvesting rollers 90 and 92, seen in relation to the rotary motion of the propulsion rollers 86 and 88, cooperate so that the bivalve net 10 is pulled in opposite directions by the front and rear pairs of rollers, so that the bivalve net 10 is thereby held tightened. At the same time, in this exemplary embodiment, each harvesting roller 90 and 92 is formed on its cylindrical surface with profiled ribs 138 and 138', projecting from said surface, cf. FIG. 8. When the harvesting rollers 90 and 92 are rotated during harvesting, the ribs 138 and 138' will scrape or mill the bivalves 6 off the bivalve net 10.

Figure 9:
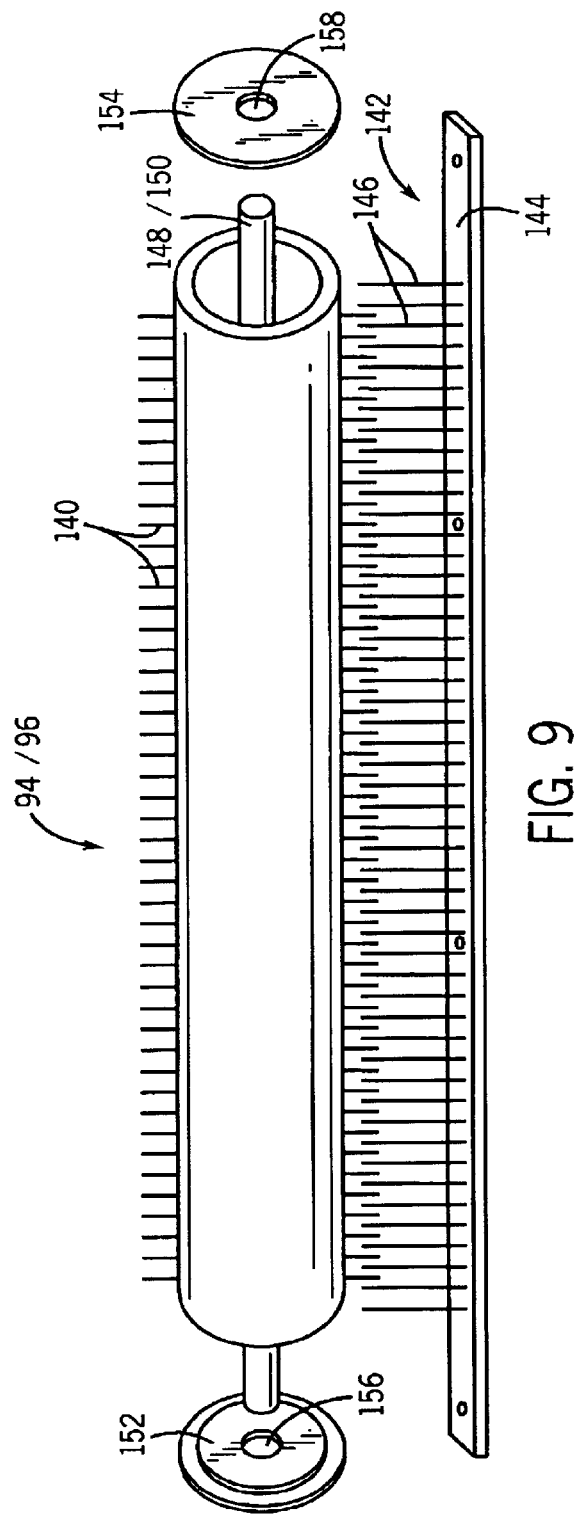
FIG. 9 shows one example of a tending or cleaning roller with outer threads attached thereto, the tending or cleaning roller bearing in a cooperating manner on a tending or cleaning brush, also with threads attached thereto, wherein unwanted organisms and possibly other unwanted material attached to the tending or cleaning roller may be removed by rotation of the tending or cleaning roller, and by the threads attached to the roller thereby being scraped or rubbed against the non-rotating threads of the tending or cleaning brush.

When the bivalves 6 are being tended, as the tending rollers 94 and 96 are rotating, the bivalves 6 are scraped or brushed. To remove unwanted organisms, e.g. starfish, the bivalves 6 are brushed sufficiently hard for starfish, for example, to come loose from the bivalves 6, but without the bivalves 6 thereby coming loose from the bivalve net 10. When the stock of bivalves is being thinned, all or some of the bivalves 6 on one side of the bivalve net 10, for example, are scraped or milled, so that the bivalves 6 come loose and fall off the bivalve net 10. FIG. 9 shows a tending or cleaning roller 94 or 96, which is formed at its outer surface with threads 140 projecting from the surface of the roller 94 or 96. During tending or cleaning of the bivalve net 10, as the tending or cleaning rollers 94 and/or 96 are being rotated, the threads 140 are scraped or rubbed against a cooperatingly positioned and stationary tending or cleaning brush 142 cf. FIG. 9, the brush 142 being formed of a longitudinal strip 144 with attached threads 146. The brush 142 is positioned longitudinally parallel to the longitudinal axis of each tending or cleaning roller 94 and/or 96, the strip 144 being secured for example to the frame part 18 and/or 20 in its position of use. In this way, for example starfish, plastic bags, drift wood or other organic or inorganic waste can thereby be removed from the bivalves 6 and/or the bivalve net 10. When removing starfish, for example, the distance between the bivalves 6 and the tending roller 94 and/or 96 should be adjusted to the required degree for the bivalves 6 not to come loose from the bivalve net 10, and at the same time for the bivalves 6 not to be crushed or damaged. When the bivalve stock is being thinned, or when the bivalve net 10 is being cleaned, the distance between the bivalves 6, possibly the bivalve net 10, and the tending or cleaning rollers 94 and/or 96 is adjusted to the required degree for the bivalves 6 or waste organisms/waste to come loose from the bivalve net 10.

Figure 8:
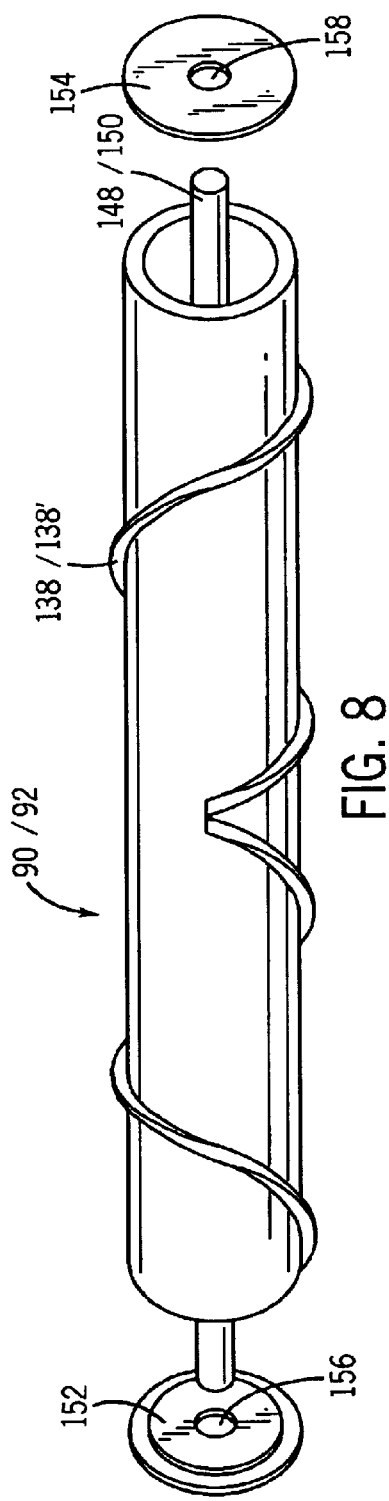
FIG. 8 shows one example of a harvesting roller, which has profiled strips attached to its outer surface.

In the same manner as for the support and operation of the propulsion rollers 86 and 88, each harvesting roller 90 and 92, possibly each tending or cleaning roller 94 and 96, is provided with a longitudinally through and rotatable centre axle 148 and 150, each of the centre axles 148 and 150 being secured at its end portions to a respective harvesting roller 90 and 92, possibly a respective harvesting or cleaning roller 94 and 96, by means of two circular mounting plates 152 and 154, each of which provided with a centred hole 156 or 158, through which the centre axle 148 or 150 is passed, cf. FIGS. 8 and 9. To provide the necessary rotary motion, each centre axle 148 and 150 has at its lower end portion in the position of use, a separate hydraulic motor 160 and 162, which is for example remotely controlled, infinitely variable and reversible. In an alternative, not shown, only one of the harvesting rollers 90 and 92, possibly one of the tending or cleaning rollers 94 and 96, is rotated by a hydraulic motor 160 or 162. In use each harvesting roller 90 and 92, possibly each tending or cleaning roller 94 and 96, is rotated at preferably equal peripheral speed. The motors 160 and 162 are each secured to a respective distance element 164 and 166, which are arranged to a mounting plate 168 and 170 each, each mounting plate 168 and 170 being arranged to a respective frame part 18 and 20. In addition each harvesting roller 90 and 92, possibly each tending or cleaning roller 94 and 96, is releasably supported at its upper end portions on a respective bearing pedestal 172 and 174, which are each secured to a respective spacer element 176 and 177, the spacer elements 176 and 177 being arranged to a frame part 18 and 20 each, by means of a respective mounting plate 178 and 179.

The bivalves 6, or the waste organisms/waste separated from the bivalve net 10, are then: caught by an inlet manifold 180, the manifold 180 being formed in its position of use, in this exemplary embodiment, by a vertical and elongate manifold funnel 182 of a square cross-section in a plan view. Longitudinally and parallel to the bivalve net 10, the inlet manifold 180 is divided into two for example equally large manifold halves 184 and 184', the manifold half 184 being secured internally on the frame part 18, and the manifold half 184' being secured internally on the frame part 20. In its position of use, the inlet manifold 180 encloses the harvesting rollers 90, 92, possibly the tending or cleaning rollers 94 and 96, and part of the bivalve net 10 with attached bivalves 6, possibly waste and/or unwanted organisms, e.g. starfish. The manifold halves 184 and 184' are spaced sufficiently from the bivalve net 10 for the manifold halves 184 and 184' not to catch on the bivalve net 10 in the harvesting or tending of the bivalves 6, possibly in the cleaning of the bivalve net 10. Additionally, along each of its vertical and opposite end portions, each manifold half 184 and 184' is provided with two vertical and longitudinal rubber strips 186 and 186' and 188 and 188', so that the rubber strips 186 and 186' project near to the bivalve net 10 and towards the rubber strips 188 and 188' on the other side of the bivalve net 10.

Loosened bivalves 6 or waste are/is then sucked into a flow of water, which is flowing, by means of a pumping device described later, essentially into the upper and open end portion of the inlet manifold 180, but also partly through open gaps between the two manifold halves 184 and 184'. The water 4 and the loosened bivalves 6, possibly waste and/or unwanted organisms, are flowing further in the downstream direction through the manifold funnel 182 positioned in the lower portion of the inlet manifold 180 and further through an opening 190 formed in an upper end portion of a so-called debunching pipe 192 to correspond with the manifold funnel 182. In the same manner as that of the inlet manifold 180, the manifold funnel 182 is divided into two for example equally large funnel halves 194 and 194', the funnel half 194 being arranged and connected to the manifold half 184, and the funnel half 194' being arranged and connected to the manifold half 184'. The funnel half 194' is permanently arranged about the opening 190 of the debunching pipe 192, whereas the funnel half 194 is releasably arranged round the opening 190 and is formed with for example a rubber seal 196, which bears, in its position of use, on the debunching pipe 192 and the vertical and opposite end portions of the other funnel half 194'. When the bivalve harvester 2 is used, most of the water 4 will thereby be sucked in through the upper portion of the inlet manifold 180.

The debunching pipe 192 is formed by an elongate and horizontal-lying pipe, placed in its position of use at the bottom portion of the bivalve harvester 2 and parallel to the floating tube 14. The debunching pipe 192 is used for breaking up, or debunch, bivalve bunches 8, as bivalves 6 often grow together into bunches on the bivalve net 10, and after harvesting i.a. such bunches 8 will be transported together with the water 4 by means of the pumping device into the debunching pipe 192. Along one of its side portions, the debunching pipe 192 is arranged to the frame part 18 through two mounting plates 198 and 200, each having an angular stay 33 and 33' arranged thereto. The other side portion of the debunching pipe 192 is arranged to the frame part 20 by two mounting plates 202 and 204, each having a respective connecting stay 206 and 208 arranged thereto. In its position of use the debunching pipe 192 is placed below the propulsion rollers 86 and 88 and the harvesting rollers 90 and 92, possibly the tending or cleaning rollers 94 and 96, so that the debunching pipe 192, during propulsion in the water 4, runs unobstructedly below the foot line 15 of the bivalve net 10.

The debunching pipe 192, moreover being cylinder-shaped and made up of two identical and releasable halves, not shown in the drawings, is arranged with a debunching device. The debunching device is formed of at least one stator part 210, which cooperates with an adjacent rotor part 212 to break apart bivalve bunches 8, the two cooperating parts 210 and 212 being referred to in the following as a debunching unit. In this exemplary embodiment, the debunching pipe 192 is longitudinally provided with five such cooperating debunching units 213, 214, 216, 218 and 220. Each stator part 210 is releasably anchored in one of the inner mantle halves of the debunching pipe 192, whereas each rotor part 212 is releasably anchored to a rotary axle 222 located along the centre line of the debunching pipe 192. Additionally, in this exemplary embodiment the stator part 210 and the rotor part 212 of each debunching unit are provided with wires 224. In another exemplary embodiment, not shown, the wires 224 could just as well have been exchanged or combined with vanes, blades or strings, or possibly different assemblies thereof, according to the targeted object.

The debunching pipe 192 is in two parts, because it should be possible to replace, possibly repair, the rotary axle 222 or stator parts 210 and/or rotor parts 212, possibly individual vanes, blades, strings or threads.

In this example the wires 224 of a stator part 210 and a rotor part 212 are disposed radially in the debunching pipe 192 and about the centre line thereof, and so that the wires 224 have a uniform angle distance about a common imaginary circumferential line. For example in the harvesting of bivalves 6 and bivalve bunches 8, the rotary axle 222 is rotated so that the rotor part 212 rotates relative to the cooperating stator part 210. When a bivalve bunch 8 in the water flow is carried into the gaps between the wires 224 in a stator part 210 and a rotor part 212, the bivalve bunch 8 will, as a consequence of the relative movement of the stator part 210 and the rotor part 212, be broken into smaller bivalve bunches 8 and individual bivalves 6. By the use of vanes or blades, for example, instead of threads or strings, and with the purpose of preventing the bivalves 6 from being crushed or damaged, the vanes or blades may possibly be provided with, or completely or partially formed of, a suitable rubber or plastic material or similar.

In this connection it is difficult to specify materials or material compositions, configurations or combinations of configurations of vanes, blades, threads or strings, as such decisions must be made according to the relevant type and quantity of bivalves 6 which it is desirable to harvest, and/or the speed desired for the harvesting of the bivalves 6.

In the exemplary embodiment the five debunching units 213, 214, 216, 218 and 220 are spaced apart unevenly along the length of the debunching pipe 192, the distance between the successive debunching units decreasing, seen in the downstream direction of the water 4 flowing through the debunching pipe 192. The use of several such debunching units 213, 214, 216, 218 and 220 may be required in order to split the bivalve bunches 8 sufficiently well in several debunching steps. In principle the bivalve bunches 8 should have been separated completely, or approximately completely, into individual bivalves 6 after the last downstream debunching step. In the tending of bivalves 6, possibly cleaning of the bivalve net 10, the rotary axle 222 and the rotor parts 212 attached thereto, and the stator part 210, should be removed.

The rotary axle 222 is rotated by e.g. a remotely controlled infinitely variable and reversible hydraulic motor 226, the motor 226 being arranged to the rotary axle 222 at the downstream end portion thereof.

The water 4 flowing through the inlet manifold 180 and the debunching pipe 192 is driven by a suitable hydraulic pump 228 connected to a remotely controlled, infinitely variable and reversible hydraulic driving motor 230. The pump 228 and the driving motor 230 are positioned immediately downstream of the debunching pipe 192. After the final debunching step the individual bivalves 6 are transported further in the water flow through a guide funnel 232 at a downstream end portion of the debunching pipe 192, then through the pump 228 and further up to the vessel or similar device through a conveyor pipe 234 of a suitable type and size. On the vessel or device the bivalves 6 may then be collected in suitable containers, e.g. cases, for possible further processing and/or further transport. In the tending of the bivalves 6, possibly cleaning of the bivalve net 10, in this exemplary embodiment, unwanted organisms, e.g. starfish, and/or other waste are transported through the debunching pipe 192, the pump 228 and the conveyor pipe 234, so that the organisms and/or the waste may be collected on the vessel or device.

What is claimed is:

1. A device, hereinafter denoted a bivalve harvester (2), for harvesting and tending, including thinning, farmed bivalves (6) that attach to and grow on a net (10) in water (4), said harvester (2) also being intended for cleaning unwanted matter from the net (10) in water (4), said net (10) being arranged to a floating device, including a floating tube (14), for suspending the net (10) substantially vertically and extending it horizontally in the water (4), said harvester (2) also being arranged to at least one floating device (14, 78, 80) and at least one propulsion device for moving the harvester (2) horizontally in the water (4), wherein said bivalve harvester (2) consists of a frame provided with at least one non-propulsion roller constituting at least one harvesting roller (90, 92) or, alternatively, at least one tending or cleaning roller (94, 96), the at least one roller (90, 92, 94, 96) being rotatable about its longitudinal axis, and wherein said at least one roller (90, 92, 94, 96), in its position of use, extends substantially vertically and parallel with the net (10), and wherein an outer surface of said at least one roller (90, 92, 94, 96) is provided with at least one scraping, milling or brushing device, said attached matter being removed from the net (10) when said at least one roller (90, 92, 94, 96) is pressed and rotated against the net (10).

2. A device according to claim 1, wherein said frame of the bivalve harvester (2) consists of two cooperating and pivotably connected frame parts (18, 20), each frame part (18, 20) being provided with a top side (22, 24) and an opposite bottom side (26, 28), the top side (22, 24) and the bottom side (26, 28) being adjoined by means of at least one connecting side (30, 30', 32, 32'), and wherein the top sides (22, 24) are pivotably connected via at least one hinge (36, 37) having a pivot axis which, in position of use, substantially is horizontal, thereby enabling the frame part (18, 20) to open and close about said net (10), and wherein at least one of said frame parts (18, 20) is provided with at least one non-propulsion roller (90, 92, 94, 96) extending from said top side (22, 24) to said bottom side (26, 28).

3. A device according to claim 1, wherein at least a bottom portion of said at least one non-propulsion roller (90, 92, 94, 96), in its position of use, is enclosed by a catching device that is open for water through-put and is provided with an outlet opening which, in position of use, is positioned underneath the at least one non-propulsion roller (90, 92, 94, 96), said catching device thus capturing material removed from the net (10) in a manner avoiding potential crushing of live bivalves (6), and wherein the catching device, for conveying said removed material away from the net (10), is connected to a pump device and a downstream transport pipe (234).

4. A device according to claim 2, wherein at least a bottom portion of said at least one non-propulsion roller (90, 92, 94, 96), in its position of use, is enclosed by a catching device consisting of two catching device parts which cooperate in their position of use, each catching device part being arranged to a respective frame part (18, 20), said two-part catching device being open for water through-put and being provided with an outlet opening which, in position of use, is positioned underneath the at least one non-propulsion roller (90, 92, 94, 96), said catching device thus capturing material removed from the net (10) in a manner avoiding potential crushing of live bivalves (6), and wherein the two-part catching device, for conveying said removed material away from the net (10), is connected to a pump device and a downstream transport pipe (234).

5. A device according to claim 4, wherein each catching device part consists of a manifold half (184, 184') and an associated funnel half (194, 194') that, in position of use, collectively form an inlet manifold (180) and an associated manifold funnel (182).

6. A device according to claim 1, wherein said frame of the bivalve harvester (2) is provided with at least one propulsion roller (86, 88) being rotatable about its longitudinal axis, and wherein said at least one propulsion roller (86, 88), in its position of use, extends substantially vertically and parallel with the net (10) and is positioned in a trailing position relative to said at least one non-propulsion roller (90, 92, 94, 96).

7. A device according to claim 2, wherein at least one frame part (18, 20) of the bivalve harvester (2) is provided with at least one propulsion roller (86, 88) being rotatable about its longitudinal axis, and wherein said least one propulsion roller (86, 88) extends between said top side (22, 24) and said bottom side (26, 28) of the frame part (18, 20), and wherein said at least one propulsion roller (86, 88), in its position of use, extends substantially vertically and parallel with the net (10) and is positioned in a trailing position relative to said at least one non-propulsion roller (90, 92, 94, 96).

8. A device according to claim 2, wherein, in position of use, each non-propulsion roller (90, 92, 94, 96) in a pair of such rollers is arranged to its own frame part (18, 20), and wherein the rollers (90, 92, 94, 96) of said pair are positioned immediately adjacent and parallel to one another.

9. A device according to claim 7, wherein, in position of use, each propulsion roller (86, 88) in a pair of such rollers is arranged to its own frame part (18, 20), and wherein the propulsion rollers (86, 88) of said pair are positioned immediately adjacent and parallel to one another.

10. A device according to claim 6, wherein said propulsion roller (86, 88) is provided with a propulsion promoting surface, including a cylindrical and evenly formed rubber membrane (98, 98'), or a surface provided with rubber knobs (100) or a surface provided with projecting teeth.

11. A device according to claim 1, wherein a harvesting roller (90, 92) has a surface provided with profiled ribs (138, 138'), strips, teeth, threads or brushes.

12. A device according to claim 1, wherein a tending or cleaning roller (94, 96) has a surface provided with threads (104), strings or brushes.

13. A device according to claim 3, wherein a debunching pipe (192) for separating clusters of bivalves (6), is connected downstream of said catching device.

14. A device according to claim 7, wherein said propulsion roller (86, 88) is provided with a propulsion promoting surface, including a cylindrical and evenly formed rubber membrane (98, 98'), or a surface provided with rubber knobs (100) or a surface provided with projecting teeth.

15. A device according to claim 9, wherein said propulsion roller (86, 88) is provided with a propulsion promoting surface, including a cylindrical and evenly formed rubber membrane (98, 98'), or a surface provided with rubber knobs (100) or a surface provided with projecting teeth.

16. A device according to claim 4, wherein a debunching pipe (192) for separating clusters of bivalves (6), is connected downstream of said catching device.

17. A device according to claim 5, wherein a debunching pipe (192) for separating clusters of bivalves (6), is connected downstream of said catching device.

* * * * *